United States Patent
Shi et al.

(10) Patent No.: US 12,244,025 B2
(45) Date of Patent: Mar. 4, 2025

(54) SECONDARY BATTERY AND BATTERY MODULE

(71) Applicant: CONTEMPORARY AMPEREX TECHNOLOGY (HONG KONG) LIMITED, Hong Kong (CN)

(72) Inventors: Dongyang Shi, Ningde (CN); Yuanbao Chen, Ningde (CN); Ning Chen, Ningde (CN); Haizu Jin, Ningde (CN); Zhenhua Li, Ningde (CN); Fei Hu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 86 days.

(21) Appl. No.: 16/817,289

(22) Filed: Mar. 12, 2020

(65) Prior Publication Data
US 2020/0212379 A1    Jul. 2, 2020

Related U.S. Application Data

(63) Continuation of application No. PCT/CN2019/075827, filed on Feb. 22, 2019.

(30) Foreign Application Priority Data

Dec. 29, 2018  (CN) .......................... 201811636967.3

(51) Int. Cl.
*H01M 50/15*     (2021.01)
*H01M 10/0525*   (2010.01)
(Continued)

(52) U.S. Cl.
CPC ....... *H01M 50/15* (2021.01); *H01M 10/0525* (2013.01); *H01M 50/147* (2021.01); *H01M 50/176* (2021.01)

(58) Field of Classification Search
CPC .... H01M 50/15; H01M 50/147; H01M 50/54; H01M 50/172
See application file for complete search history.

(56) References Cited

U.S. PATENT DOCUMENTS

| 7,927,727 B2 | 4/2011 | Kim et al. |
| 2002/0041993 A1 | 4/2002 | Kim et al. |
| (Continued) | | |

FOREIGN PATENT DOCUMENTS

| CN | 1713442 A | 12/2005 |
| CN | 102738423 A | 10/2012 |
| (Continued) | | |

OTHER PUBLICATIONS

Machine Translation of WO 2018043890 A1 (Year: 2018).*
(Continued)

*Primary Examiner* — Matthew T Martin
*Assistant Examiner* — Unique Jenevieve Luna
(74) *Attorney, Agent, or Firm* — XSENSUS LLP (57) ABSTRACT

The present disclosure provides a secondary battery and a battery module. The secondary battery includes an electrode assembly, a case and a cap assembly. The case has an accommodating cavity, and the electrode assembly is accommodated in the accommodating cavity. The electrode assembly comprises electrode units stacked in an axial direction of the accommodating cavity. The cap assembly comprises a cap plate and a vent piece, the cap plate is connected with the case and positioned at a side of the electrode assembly in the axial direction. The cap plate is provided with a through-hole, and the vent piece covers the through-hole. The cap plate has a first inner surface, the vent piece has a second inner surface, and a distance between the
(Continued)

first inner surface and the electrode assembly is larger than a distance between the second inner surface and the electrode assembly.

20 Claims, 5 Drawing Sheets

(51) Int. Cl.
*H01M 50/147* (2021.01)
*H01M 50/176* (2021.01)

(56) References Cited

U.S. PATENT DOCUMENTS

| | | | |
|---|---|---|---|
| 2005/0287422 A1 | 12/2005 | Kim et al. | |
| 2012/0177961 A1 | 7/2012 | Lee et al. | |
| 2012/0214029 A1 | 8/2012 | Lee et al. | |
| 2012/0258338 A1 | 10/2012 | Kim | |
| 2013/0209843 A1* | 8/2013 | Ito | H01M 50/30 |
| | | | 429/53 |
| 2017/0098808 A1* | 4/2017 | Guen | H01M 50/553 |
| 2018/0097209 A1 | 4/2018 | Striegel et al. | |
| 2018/0138465 A1 | 5/2018 | Yang et al. | |

FOREIGN PATENT DOCUMENTS

| | | | | |
|---|---|---|---|---|
| CN | 105609882 A | * | 5/2016 | |
| CN | 107732041 A | | 2/2018 | |
| CN | 108428821 A | | 8/2018 | |
| CN | 108428824 A | | 8/2018 | |
| CN | 108428921 A | | 8/2018 | |
| CN | 108461665 A | | 8/2018 | |
| CN | 207818654 U | | 9/2018 | |
| CN | 209183613 U | | 7/2019 | |
| EP | 2482356 A2 | | 8/2012 | |
| JP | 2005251548 A | | 9/2005 | |
| JP | 2014049190 A | | 3/2014 | |
| KR | 20100088705 A | * | 8/2010 | |
| WO | WO 2013/168585 A1 | | 11/2013 | |
| WO | WO-2013168989 A1 | * | 11/2013 | H01M 50/30 |
| WO | WO 2018/043890 A1 | | 3/2018 | |
| WO | WO 02/27819 A1 | | 4/2020 | |

OTHER PUBLICATIONS

Machine Translation of CN 105609882 A (Year: 2016).*
Machine Translation of WO 2013168989 A1 (Year: 2013).*
Machine translation of KR 20100088705 A (Year: 2010).*
Contemporary Amperex Technology Co., Limited, Extended European Search Report, EP19856494.0, Sep. 18, 2020,, 8 pgs.
Contemporary Amperex Technology Co., Limited, International Search Report and Written Opinion, PCT/CN2019/075827, Sep. 20, 2019, 15 pgs.
Office Action issued Mar. 9, 2024 in Chinese Patent Application No. 201811636967.3 with English translation thereof.
Jiang, Nan-xi, "Structure design of explosion proof cap for new energy vehicle", Chinese Journal of Power Sources, vol. 42, Issue 8, pp. 1129-1133, Aug. 20, 2018 (English Abstract included).

* cited by examiner

SECONDARY BATTERY AND BATTERY MODULE

CROSS REFERENCE TO RELATED APPLICATIONS

This application is a continuation application of PCT/CN2019/075827, filed on Feb. 22, 2019, which claims priority to Chinese Patent Application No. 201811636967.3, filed with the National Intellectual Property Administration of the People's Republic of China on Dec. 29, 2018, all of which are incorporated herein by reference in their entirety.

TECHNICAL FIELD

The present disclosure relates to the field of battery, and particularly relates to a secondary battery and a battery module.

BACKGROUND

A battery module generally includes secondary batteries arranged sequentially, and each secondary battery is provided with an electrode assembly inside. In the charge process or discharge process, the electrode assembly will expand in an arrange direction of the secondary batteries; expanding forces generated by the electrode assemblies of the secondary batteries will be accumulated in the arrange direction and form an excessive composite force; the composite force presses the secondary batteries, which leads to the secondary battery being unable to work normally and influences the life of the secondary battery.

SUMMARY

An secondary battery in accordance with some embodiments comprises an electrode assembly, a case and a cap assembly. The case has an accommodating cavity, the accommodating cavity has an opening, and the electrode assembly is accommodated in the accommodating cavity. The electrode assembly comprises electrode units, and the electrode units are stacked in an axial direction of the accommodating cavity. The cap assembly comprises a cap plate and a vent piece, the cap plate is connected with the case and positioned at a side of the electrode assembly in the axial direction. The cap plate is provided with a through-hole, and the vent piece is connected with the cap plate and covers the through-hole. The cap plate has a first inner surface at a side close to the electrode assembly, the vent piece has a second inner surface at a side close to the electrode assembly, and the second inner surface is positioned at a side of the first inner surface away from the electrode assembly.

Reference numerals in figures are represented as follows:
1 electrode assembly
11 electrode unit
111 first electrode plate
112 second electrode plate
113 separator
2 case
21 accommodating cavity
3 cap assembly
31 cap plate
311 through-hole
312 first inner surface
313 first groove
314 second groove
315 third groove
32 vent piece
321 second inner surface
33 insulating member
331 third inner surface
34 electrode terminal
35 protecting piece
4 current collecting member
S1 wide surface
S2 narrow surface
X length direction
Y width direction
Z axial direction

DETAILED DESCRIPTION

To make the object, technical solutions and advantages of the present disclosure more apparent, hereinafter the present disclosure will be further described in detail in combination with the accompanying figures and the embodiments. It should be understood that the specific embodiments described herein are merely used to explain the present disclosure but are not intended to limit the present disclosure.

In the description of the present disclosure, unless otherwise specifically defined and limited, the terms "first", "second" and "third" are only used for illustrative purposes and are not to be construed as expressing or implying a relative importance. The term "plurality" is two or more. Unless otherwise defined or described, the term "connect" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

In the description of the present disclosure, it should be understood that spatially relative terms, such as "above", "below" and the like, are described based on orientations illustrated in the figures, but are not intended to limit the embodiments of the present disclosure.

In the present disclosure, a battery module in accordance with some embodiments generally includes a secondary battery, an end plate, a side plate and a busbar. The secondary battery is provided as plurality in number and the plurality of secondary batteries are arranged sequentially. The secondary battery in accordance with some embodiments is a prismatic lithium-ion battery. An arrange direction of the secondary batteries is parallel to a width direction Y of each secondary battery. The end plate is provide as two in number and the two end plates are respectively provided at two ends of the secondary batteries in the arrange direction, the side plate is provided as two in number and the two side plates are respectively provided at two sides of the secondary batteries. The end plates and the side plates are welded together to form a rectangular frame. The secondary batteries are fixed to the frame. The busbar connects the secondary batteries together in series, in parallel or in series-parallel.

Figure 1:
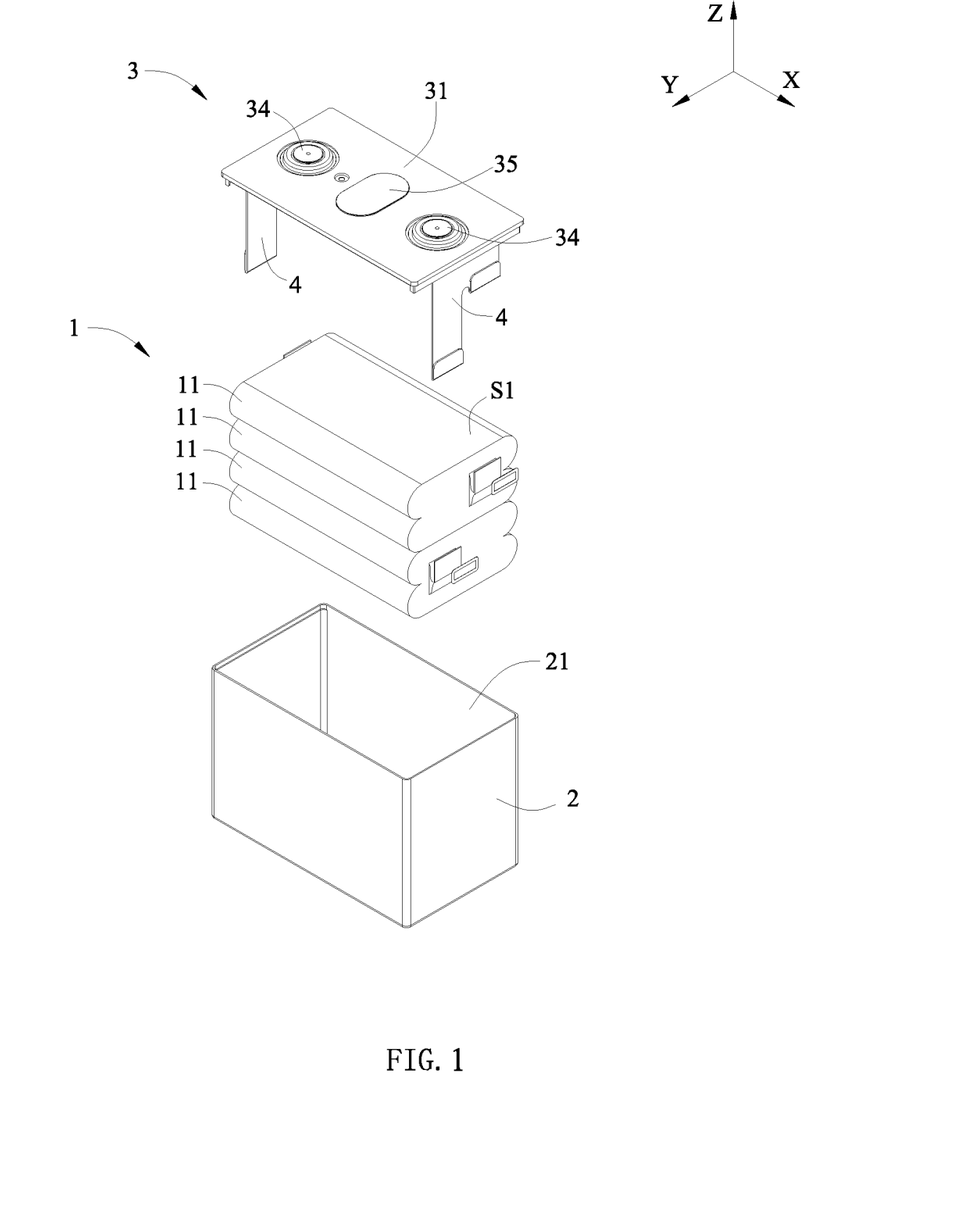
FIG. 1 is an exploded view of an embodiment of a secondary battery according to the present disclosure.
Figure 2:
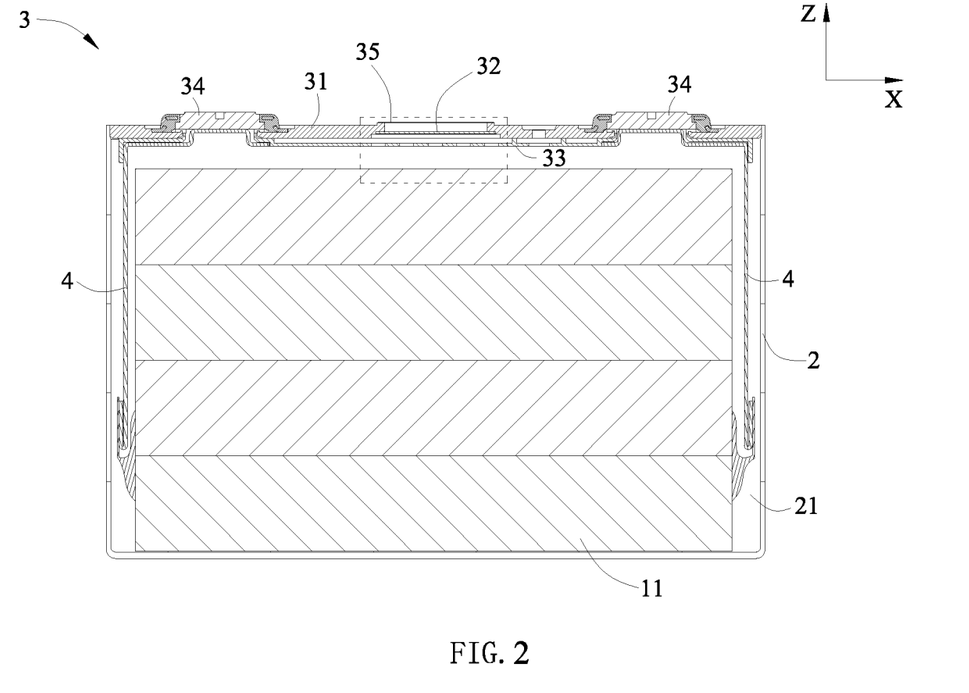
FIG. 2 is a cross sectional view of the secondary battery according to the present disclosure.

Referring to FIG. 1 and FIG. 2, the secondary battery in accordance with some embodiments includes an electrode assembly 1, a case 2, a cap assembly 3 and a current collecting member 4.

An accommodating cavity 21 is formed in the case 2 to receive the electrode assembly 1 and an electrolyte. An opening is formed at an end of the case 2 in an axial direction Z, and the electrode assembly 1 is placed into the case 2 via the opening. In some embodiments, the case 2 is made of conductive metal material, such as aluminum, aluminum alloy or the like. The axial direction Z is parallel to an extending direction of the accommodating cavity 21 and perpendicular to a plane in which the opening is located. The battery module in accordance with some embodiments can be used in an electric vehicle; when the cap assembly 3 of the secondary battery in the electric vehicle is substantially parallel to the ground, the axial direction Z is parallel to a height direction of the secondary battery, perpendicular to the width direction Y of the secondary battery, a length direction X of the secondary battery and the arrange direction of the secondary batteries.

Figure 3:
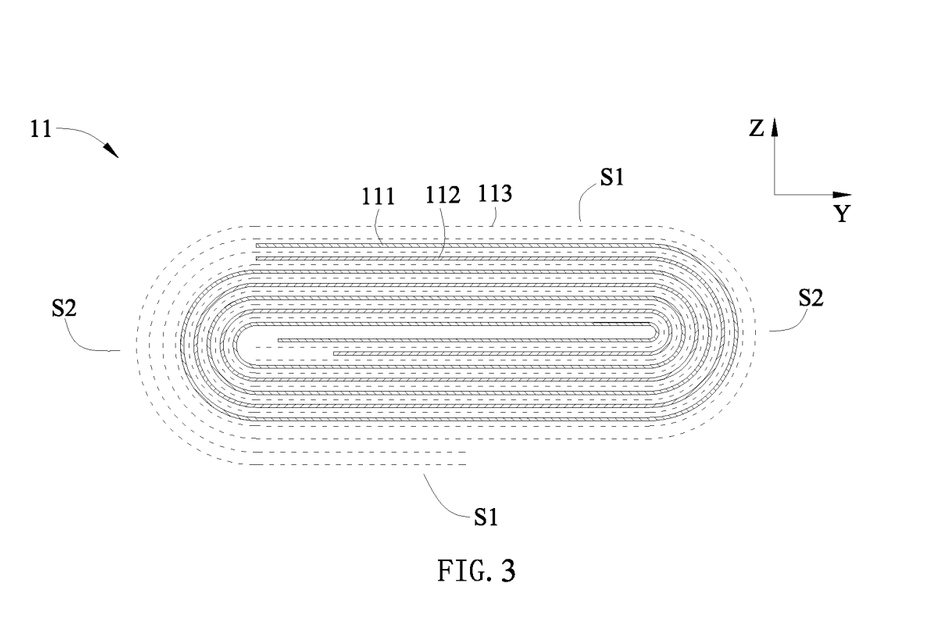
FIG. 3 is a schematic view of an electrode unit in FIG. 1.

The electrode assembly 1 in accordance with some embodiments includes electrode units 11, and the electrode units 11 are stacked in the axial direction Z of the accommodating cavity 21. Referring to FIG. 3, each electrode unit 11 includes a first electrode plate 111, a second electrode plate 112 and a separator 113, and the separator 113 separates the first electrode plate 111 and the second electrode plate 112. The electrode unit 11 can be formed by spirally winding the first electrode plate 111, the second electrode plate 112 and the separator 113, and the electrode unit 11 is pressed to a flat structure. Alternatively, each electrode unit 11 also can be formed by stacking the first electrode plate 111, the second electrode plate 112 and the separator 113.

The first electrode plate 111 includes an aluminum foil and a positive active material coated on a surface of the aluminum foil, the positive active material includes lithium manganese oxide or lithium iron phosphate. The second electrode plate 112 includes a copper foil and a negative active material coated on a surface of the copper foil, the negative active material includes graphite or silicon.

Figure 4:
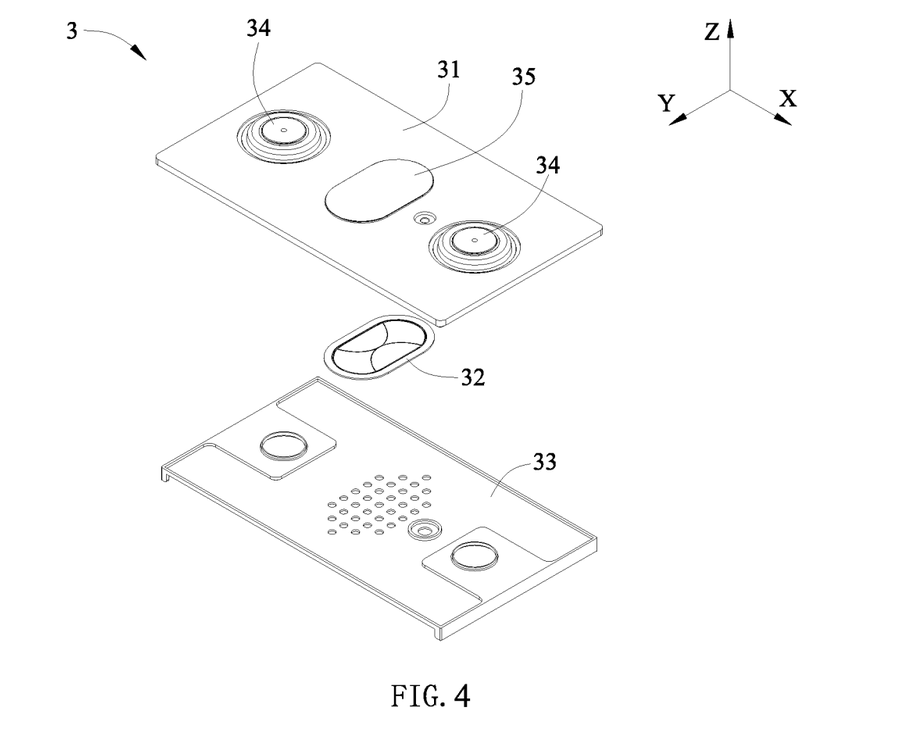
FIG. 4 is an exploded view of a cap assembly of the secondary battery in FIG. 1.

The cap assembly 3 in accordance with some embodiments includes a cap plate 31, a vent piece 32, an insulating member 33 and an electrode terminal 34.

The cap plate 31 is connected with the case 2 and covers the opening of the case 2, thereby sealing the electrode assembly 1 inside the accommodating cavity 21 of the case 2. The insulating member 33 is provided at a side of the cap plate 31 close to the electrode assembly 1, that is, the insulating member 33 is provided between the cap plate 31 and the electrode assembly 1; in some embodiments, the insulating member 33 is connected with the cap plate 31 by thermal melting. The electrode terminal 34 is provided to the cap plate 31 and protrudes to outside of the cap plate 31.

Both of the electrode terminal 34 and the current collecting member 4 are provided as two in number, one the current collecting member 4 connects the first electrode plate 111 and one electrode terminal 34, the other current collecting member 4 connects the second electrode plate 112 and the other electrode terminal 34.

In the charge process or discharge process, each electrode unit 11 will expand. In some embodiments, the electrode units 11 of the secondary battery are stacked in the axial direction Z, so expansions of the electrode units 11 will be accumulated in the axial direction Z. In the width direction Y, the expansions of the electrode units 11 is smaller, so the overall expansion amount of the electrode assembly 1 in the width direction Y is smaller, correspondingly, an expanding force applied to the case 2 by the electrode assembly 1 is smaller too.

In the battery module, the arrange direction of the secondary batteries is perpendicular to the axial direction Z, so even though the expansion amounts of all the electrode assemblies 1 are accumulated in the arrange direction, it still will not generate an excessive composite force, thereby avoiding the secondary battery being crushed, and ensuring the performance and life of the secondary battery.

In addition, in known technology, two end plates of the battery module need to clamped the secondary batteries; if the composite force generated by the expansions of the secondary batteries is excessive, it may lead to a welding position between the end plate and the side plate fracturing and result in failure of the battery module. In the present disclosure, the composite force generated by the secondary batteries when expanding is small, thereby avoiding the failure of the battery module.

The cap plate 31 is positioned at a side of the electrode assembly 1 in the axial direction Z, in other words, the cap plate 31 is positioned at an end of the electrode units 11 in a stacked direction of the electrode units 11. The cap plate 31 is provided with a through-hole 311, the through-hole 311 in accordance with some embodiments is positioned at a central region of the cap plate 31 in the length direction X. The cap plate 31 has a first inner surface 312 at a side close to the electrode assembly 1, and the first inner surface 312 is a substantially flat surface perpendicular to the axial direction Z.

The vent piece 32 is connected with the cap plate 31 and covers the through-hole 311. The vent piece 32 has a second inner surface 321 at a side close to the electrode assembly 1, and the second inner surface 321 is substantially parallel to the first inner surface 312.

The vent piece 32 has a notch. When the secondary battery suffers short circuit, the electrode assembly 1 generates a large amounts of gas, the gas can break through the vent piece 32, thereby timely exhausting the gas to the outside of the secondary battery, avoiding explosion and reducing safety risk.

Figure 5:
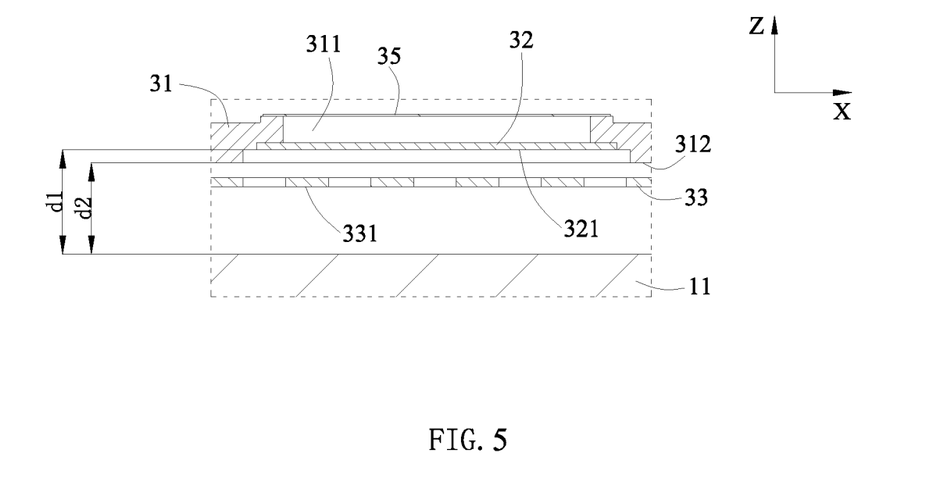
FIG. 5 is an enlarged view of a part of FIG. 2 within a rectangular frame.

Referring to FIG. 2 and FIG. 5, in the secondary battery, when the electrode units 11 expand, the expansions of the electrode units 11 will be accumulated in the axial direction Z, thereby leading to the electrode unit 11 of the electrode assembly 1 closest to the insulating member 33 pressing the insulating member 33. The insulating member 33 transfers an expanding force to the first inner surface 312 of the cap plate 31, which leads to deformation of the cap plate 31. In known technology, the vent piece 32 is mostly provided below the cap plate 31; when the electrode units 11 expand, the insulating member 33 will press the vent piece 32; the strength of the vent piece 32 is small, so the vent piece 32 is easy to rupture under the influence of pressure, thereby resulting in safety risk and leading to a failure of secondary battery.

Therefore, in some embodiments, referring to FIG. 5, the second inner surface 321 is positioned at a side of the first inner surface 312 away from the electrode assembly 1, that is, a distance d2 between the first inner surface 312 and the electrode assembly 1 is smaller than a distance d1 between the second inner surface 321 and the electrode assembly 1. In the present disclosure, the second inner surface 321 is recessed relative to the first inner surface 312, so when the electrode units 11 expand, the first inner surface 312 can block the electrode unit 11 and the insulating member 33, avoid the insulating member 33 directly pressing the vent piece 32, thereby avoiding the rupture of the vent piece 32 under normal gas pressure, reducing safety risk and extending the working life of the secondary battery.

The insulating member 33 is provided with exhaust holes below the vent piece 32. When the secondary battery suffers short circuit, the gas can be applied to the vent piece 32 via the exhaust holes, thereby breaking through the vent piece 32 and exhausting the gas to the outside of the secondary battery.

Figure 6:
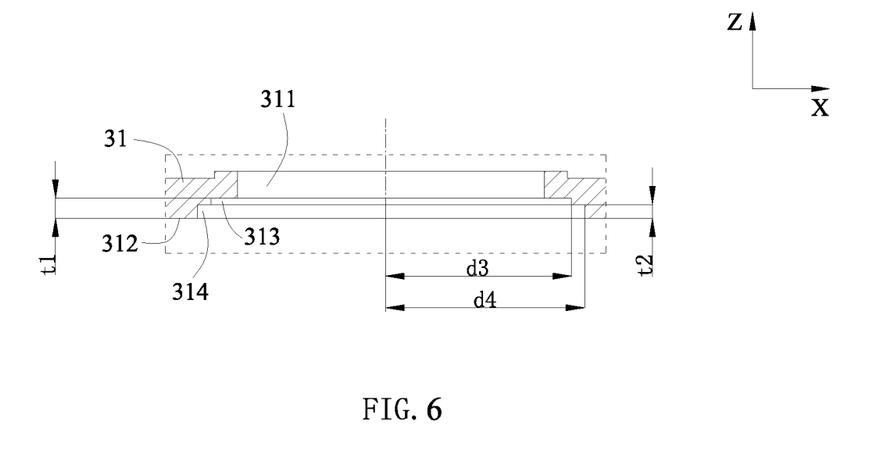
FIG. 6 is a schematic view of a cap plate in FIG. 5

Referring to FIG. 5 and FIG. 6, the cap plate 31 in accordance with some embodiments is further provided with a first groove 313, the first groove 313 extends from the first inner surface 312 in a direction away from the electrode assembly 1, and the first groove 313 is disposed along a periphery of the through-hole 311. The first groove 313 is in the shape of annulus. The vent piece 32 is provided in the first groove 313, in the axial direction Z, a depth t1 of the first groove 313 is larger than a thickness of the vent piece 32. A surface of the vent piece 32 away from the electrode assembly 1 is attached on an annular bottom wall of the first groove 313, and a periphery of the vent piece 32 is welded with a side wall of the first groove 313 in some embodiments.

In the present disclosure, by providing the first groove 313, a value of the distance d1 is larger than a value of the distance d2, thereby avoiding the vent piece 32 rupturing under the influence of the expansion of the electrode assembly 1.

In some embodiments, the cap plate 31 is further provided with a second groove 314, the second groove 314 extends from the first inner surface 312 along the direction away from the electrode assembly 1, and the second groove 314 is disposed along a periphery of the first groove 313. The second groove 314 is in the shape of annulus, and a distance d4 between a side wall of the second groove 314 and a center axis of the through-hole 311 is larger than a distance d3 between the side wall of the first groove 313 and the center axis of the through-hole 311.

The depth t1 of the first groove 313 is larger than a depth t2 of the second groove 314. By providing the first groove 313 and the second groove 314, a step structure is formed in the cap plate 31. When assembling the cap plate 31 and the vent piece 32, it puts the vent piece 32 into the first groove 313 firstly and makes the vent piece 32 attached on the bottom wall of the first groove 313, then welds the side wall of the first groove 313 and the vent piece 32 together. In the present disclosure, by providing the second groove 314, a junction between the side wall of the first groove 313 and the vent piece 32 is exposed, so a laser can directly act to the junction, thereby simplifying welding process and improve welding accuracy.

When the electrode units 11 expand, the insulating member 33 deforms under the influence of the expanding force; when the insulating member 33 deforms, it may extend into the second groove 314; if the depth of the second groove 314 is too small, the insulating member 33 may still press the vent piece 32, which leads to the vent piece 32 rupturing, therefore, in some embodiments, the depth of the second groove 314 is not less than 0.2 mm.

If the depth of the second groove 314 is too large, the cap plate 31 needs to have a larger thickness; the larger the thickness of the cap plate 31 is, the greater the strength of the cap plate 31 is. When the electrode units 11 expand, the cap plate 31 will apply a larger reaction force to the electrode unit 11, the reaction force will decrease a gap between the first electrode plate 111 and the second electrode plate 112, which leads to the electrolyte being unable to enter into the electrode unit 11 and results in lithium precipitation. Therefore, in some embodiments, the depth of the second groove 314 is not larger than 0.8 mm. In conclusion, the depth of the second groove 314 is 0.2 mm-0.8 mm.

The first groove 313 and the second groove 314 form a step surface, the step surface is an annular bottom wall of the second groove 314 and is flush with the second inner surface 321; the "flush" is not required to be absolutely flush, and an allowable error is acceptable. When the step surface is flush with the second inner surface 321, the laser directly acts to a junction between the step surface and the second inner surface 321, thereby simplifying welding process and improve welding accuracy.

When the electrode units 11 expand, the insulating member 33 deforms under the influence of the expanding force; if the insulating member 33 contacts the second inner surface 321 of the vent piece 32, the insulating member 33 is easy to crush the vent piece 32. Therefore, in some embodiments, a first gap is kept between the vent piece 32 and the insulating member 33.

Further, in some embodiments, a second gap is kept between the insulating member 33 and the first inner surface 312. By providing the second gap, it avoids the cap plate 31 limiting the deformation of the insulating member 33, thereby functioning as buffering. In other words, the second gap can decrease the expanding force transferred to the cap plate 31 by absorbing the expansion of the electrode assembly 1, thereby reducing the deformation of the cap plate 31 and promoting the appearance and performance of the secondary battery. At the same time, by providing the second gap, it also can increase the distance between the insulating member 33 and the vent piece 32, thereby avoiding the vent piece 32 being crushed.

The insulating member 33 has a third inner surface 331 at a side close to the electrode assembly 1, and the third inner surface 331 is a flat surface. In the secondary battery, when the electrode units 11 expand, the expansions of the electrode units 11 will be accumulated in the axial direction Z, thereby leading to the electrode unit 11 contacting the third inner surface 331 of the insulating member 33, and even pressing the third inner surface 331. If the third inner surface 331 is uneven, a force applied to the electrode unit 11 by the third inner surface 331 is uneven too, thereby leading to local deformation of the electrode unit 11 being serious, resulting in the electrode plate of the electrode unit 11 fracturing, and causing safety risk. In the present disclosure, the third inner surface 331 is a flat surface, so when the electrode units 11 expand, it can avoid the electrode unit 11 deforming uneven, prevent the electrode plate from fracturing and improve safety performance. In order to ensure that the electrode units 11 deform evenly, a flatness of the third inner surface 331 is smaller than or equal to 0.5 mm.

Referring to FIG. 3, the electrode unit 11 is a flat structure formed by winding, a periphery of the electrode unit 11 forms a wide surface S1 and a narrow surface S2. The wide surface S1 is provided as two in number and the two wide surfaces S1 are respectively positioned at two ends of the electrode unit 11 in the axial direction Z, the narrow surface S2 is provided as two in number and the two narrow surfaces S2 are respectively positioned at two ends of the electrode unit 11 in the width direction Y. Each narrow surface S2 is in the shape of arc and connects the two wide surfaces S1.

The wide surface S1 is disposed to face the first inner surface 312, the second inner surface 321 and the third inner surface 331 in the axial direction Z. Before the electrode units 11 expand, the wide surface S1 is approximately parallel to the first inner surface 312, the second inner surface 321 and the third inner surface 331. The wide surface S1 has a larger area, when the electrode units 11 expand, the wide surface S1 and the third inner surface 331 facing each other are easier to contact evenly; at the same time, the expanding force also is evenly transferred to the first inner surface 312.

In the secondary battery, the electrode units 11 are directly stacked in the axial direction Z. Two adjacent electrode units 11 contact each other via the wide surfaces S1 thereof.

The cap assembly 3 in accordance with some embodiments further includes a protecting piece 35, and the protecting piece 35 is welded with the cap plate 31 from outside and covers the through-hole 311. The protecting piece 35 avoids foreign materials damaging the vent piece 32.

Hereinafter a second embodiment of the secondary battery of the present disclosure will be described. In order to make description concise, hereinafter the differences between the second embodiment and the first embodiment are mainly described, the part which is not described can be understood with reference to the first embodiment.

Figure 7:
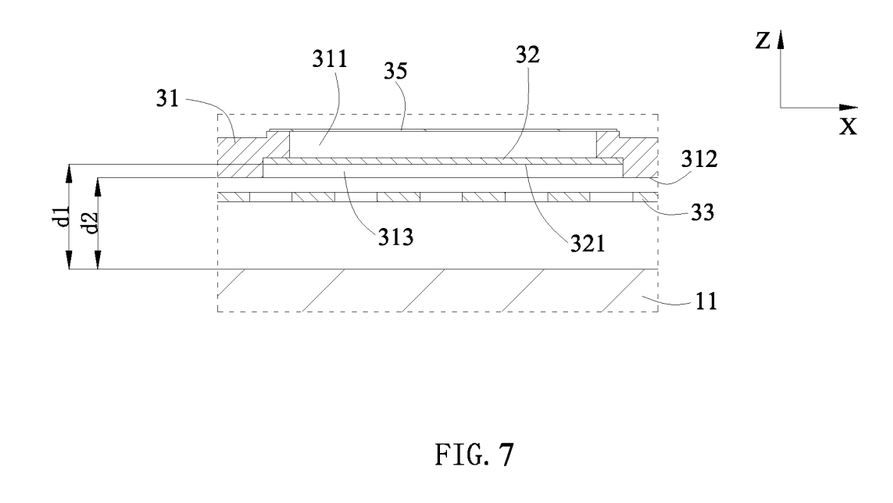
FIG. 7 is a schematic view of another embodiment of the secondary battery according to the present disclosure.

Referring to FIG. 7, compared to the first embodiment, the second groove 314 in the second embodiment is omitted. In the second embodiment, it simplifies the forming process of the cap plate 11 by omitting the second groove 314. However, in the second embodiment, because the second groove 314 is omitted, when welding, the laser is easily blocked by the side wall of the first groove 313, which leads to a higher requirement on incident angle and incident accuracy of the laser, and is not beneficial to industrial production. When the incident angle of the laser deviates, the laser is easy to act on the first inner surface 312, and a welding region will be formed on the first inner surface 312, the welding region is easy to pierce the insulating member 33, thereby resulting in safety risk.

Figure 8:
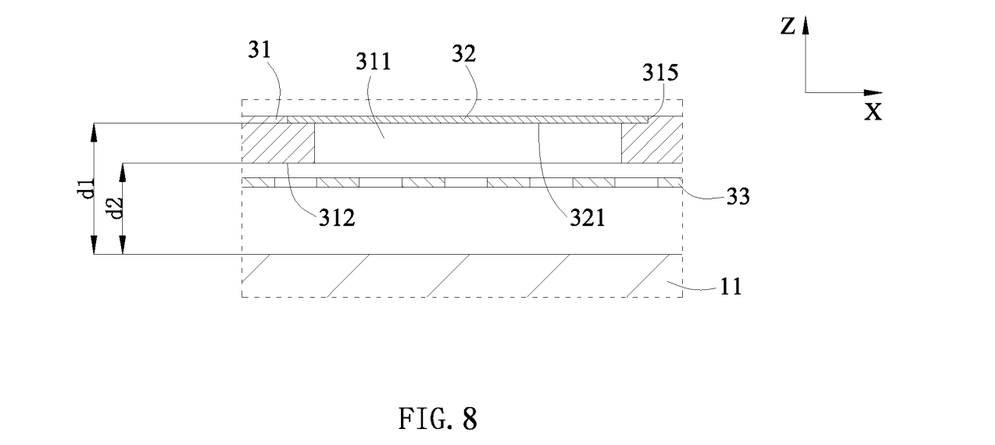
FIG. 8 is a schematic view of still another embodiment of the secondary battery according to the present disclosure.
Figure 9:
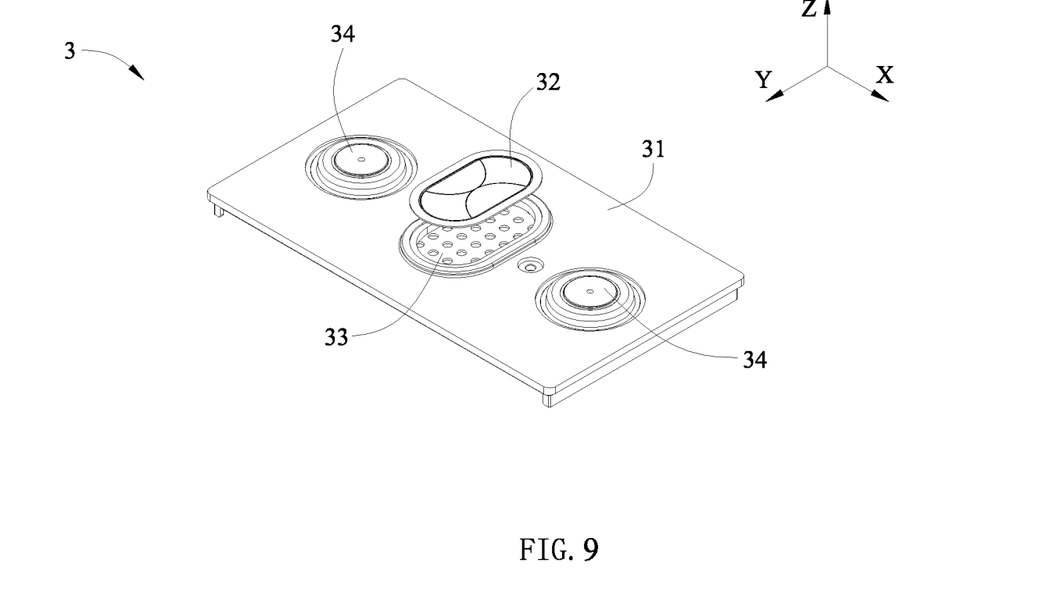
FIG. 9 is a schematic view of the cap assembly of the secondary battery in FIG. 8.

Referring to FIG. 8 and FIG. 9, compared to the first embodiment, a third embodiment omits the first groove 313 and the second groove 314.

Specifically, the cap plate 31 is provided with a third groove 315, the third groove 315 is provided at a side of the cap plate 31 away from the electrode assembly 1, and the third groove 315 is disposed along a periphery of the through-hole 311. The third groove 315 in the shape of annulus. The vent piece 32 is provided in the third groove 315.

In the third embodiment, the vent piece 32 is provided at an outer side of the cap plate 31, so a distance between the vent piece 32 and the insulating member 33 is larger; when the electrode units 11 expand, the vent piece 32 is not easily crushed.

At the same time, by providing the third groove 315, it decreases the space occupied by the vent piece 32 in the axial direction Z, avoids the vent piece 32 increasing an overall height of the secondary battery.

What is claimed is:

1. A secondary battery, comprising an electrode assembly, a case and a cap assembly;
   the case having an accommodating cavity, the accommodating cavity having an opening, and the electrode assembly being accommodated in the accommodating cavity;
   the electrode assembly comprising electrode units, and the electrode units being stacked in an axial direction of the accommodating cavity;
   the cap assembly comprising a cap plate and a vent piece, the cap plate having a length and a width, the cap plate being connected with the case and positioned at a side of the electrode assembly in the axial direction;
   the cap plate being provided with a through-hole at a central region of the cap plate in a length direction of the cap plate, the through-hole overlapping a middle point of the cap plate in the length direction, the through-hole having a shape with a maximum spacing oriented along a width direction of the cap plate, the vent piece being connected with the cap plate and covering the through-hole;
   the cap plate having a first inner surface at a side close to the electrode assembly, the vent piece having a second inner surface at a side close to the electrode assembly, and the second inner surface being positioned at a side of the first inner surface away from the electrode assembly; and
   the cap assembly further comprising a protecting piece, and the protecting piece being mounted to a top surface of the cap plate from outside and covering the through-hole, and the vent piece being connected to a bottom surface of the cap plate positioned at the side of the first inner surface away from the electrode assembly.

2. The secondary battery according to claim 1, wherein the cap plate is further provided with a first groove, the first groove extends from the first inner surface in a direction away from the electrode assembly, and the first groove is disposed along a periphery of the through-hole;
   the vent piece is provided in the first groove, and a depth of the first groove is larger than a thickness of the vent piece.

3. The secondary battery according to claim 2, wherein the cap plate is further provided with a second groove, the second groove extends from the first inner surface along the direction away from the electrode assembly, and the second groove is disposed along a periphery of the first groove;
   the depth of the first groove is larger than a depth of the second groove.

4. The secondary battery according to claim 3, wherein the depth of the second groove is 0.2 mm-0.8 mm.

5. The secondary battery according to claim 3, wherein the first groove and the second groove form a step surface, the step surface is flush with the second inner surface.

6. The secondary battery according to claim 5, wherein the vent piece is welded with a side wall of the first groove by laser.

7. The secondary battery according to claim 1, wherein the second inner surface is parallel to the first inner surface.

8. The secondary battery according to claim 1, wherein the cap plate is further provided with a third groove, the third groove is provided at a side of the cap plate away from the electrode assembly, and the third groove is disposed along a periphery of the through-hole;

the vent piece is provided in the third groove.

9. The secondary battery according to claim 1, wherein the secondary battery further comprises an insulating member, the insulating member is provided at the side of the cap plate close to the electrode assembly and connected with the cap plate;

a first gap is kept between the vent piece and the insulating member.

10. The secondary battery according to claim 9, wherein the insulating member has a third inner surface at a side close to the electrode assembly, and a flatness of the third inner surface is smaller than or equal to 0.5 mm.

11. The secondary battery according to claim 9, wherein a second gap is kept between the insulating member and the first inner surface.

12. The secondary battery according to claim 1, wherein the electrode unit is a flat structure and has a wide surface and a narrow surface;

the wide surface is disposed to face the first inner surface, the second inner surface and the third inner surface in the axial direction, the narrow surface is connected with the wide surface and positioned at an end of the electrode unit in a width direction.

13. The secondary battery according to claim 12, wherein the narrow surface is in the shape of arc.

14. A battery module, comprising secondary batteries arranged sequentially;

each secondary battery comprising an electrode assembly, a case and a cap assembly;

the case having an accommodating cavity, the accommodating cavity having an opening, and the electrode assembly being accommodated in the accommodating cavity;

the electrode assembly comprising electrode units, and the electrode units being stacked in an axial direction of the accommodating cavity;

the cap assembly comprising a cap plate and a vent piece, the cap plate having a length and a width, the cap plate being connected with the case and positioned at a side of the electrode assembly in the axial direction;

the cap plate being provided with a through-hole at a central region of the cap plate in a length direction of the cap plate, the through-hole overlapping a middle point of the cap plate in the length direction, the through-hole having a shape with a maximum spacing oriented along a width direction of the cap plate, the vent piece being connected with the cap plate and covering the through-hole;

the cap plate having a first inner surface at a side close to the electrode assembly, the vent piece having a second inner surface at a side close to the electrode assembly, and the second inner surface being positioned at a side of the first inner surface away from the electrode assembly;

an arrange direction of the secondary batteries being perpendicular to the axial direction; and the cap assembly further comprising a protecting piece, and the protecting piece being mounted to a top surface of the cap plate from outside and covering the through-hole, and the vent piece being connected to a bottom surface of the cap plate positioned at the side of the first inner surface away from the electrode assembly.

15. The battery module according to claim 14, wherein the cap plate is further provided with a first groove, the first groove extends from the first inner surface in a direction away from the electrode assembly, and the first groove is disposed along a periphery of the through-hole;

the vent piece is provided in the first groove, and a depth of the first groove is larger than a thickness of the vent piece.

16. The battery module according to claim 15, wherein the cap plate is further provided with a second groove, the second groove extends from the first inner surface along the direction away from the electrode assembly, and the second groove is disposed along a periphery of the first groove;

the depth of the first groove is larger than a depth of the second groove.

17. The battery module according to claim 16, wherein the first groove and the second groove form a step surface, the step surface is flush with the second inner surface;

the vent piece is welded with a side wall of the first groove by laser.

18. The battery module according to claim 14, wherein the secondary battery further comprises an insulating member, the insulating member is provided at the side of the cap plate close to the electrode assembly and connected with the cap plate;

a first gap is kept between the vent piece and the insulating member.

19. The battery module according to claim 14, wherein the battery module further comprises two end plates and two side plates, the two end plates are respectively provided at two ends of the secondary batteries in the arrange direction of the secondary batteries, the two side plates are respectively provided at two sides of the secondary batteries, the two end plates and the two side plates are welded together to form a rectangular frame.

20. An electric vehicle, comprising a battery module, the battery module comprising secondary batteries arranged sequentially;

each secondary battery comprising an electrode assembly, a case and a cap assembly;

the case having an accommodating cavity, the accommodating cavity having an opening, and the electrode assembly being accommodated in the accommodating cavity;

the electrode assembly comprising electrode units, and the electrode units being stacked in an axial direction of the accommodating cavity;

the cap assembly comprising a cap plate and a vent piece, the cap plate having a length and a width, being connected with the case and positioned at a side of the electrode assembly in the axial direction;

the cap plate being provided with a through-hole at a central region of the cap plate in a length direction of the cap plate, the through-hole overlapping a middle point of the cap plate in the length direction, the through-hole having a shape with a maximum spacing oriented along a width direction of the cap plate, the vent piece being connected with the cap plate and covering the through-hole;

the cap plate having a first inner surface at a side close to the electrode assembly, the vent piece having a second inner surface at a side close to the electrode assembly, and the second inner surface being positioned at a side of the first inner surface away from the electrode assembly;

an arrange direction of the secondary batteries being perpendicular to the axial direction; and the cap assembly further comprising a protecting piece, and the protecting piece being mounted to a top surface of the cap plate from outside and covering the through-hole, and the vent piece being connected to a bottom surface of the cap plate positioned at the side of the first inner surface away from the electrode assembly.

* * * * *